US007685479B2

(12) United States Patent
Schoenfeld

(10) Patent No.: US 7,685,479 B2
(45) Date of Patent: Mar. 23, 2010

(54) TELECOMMUNICATIONS NETWORK TESTING

(75) Inventor: Christian Schoenfeld, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 845 days.

(21) Appl. No.: 11/412,260

(22) Filed: Apr. 26, 2006

(65) Prior Publication Data

US 2007/0011540 A1    Jan. 11, 2007

(30) Foreign Application Priority Data

Apr. 28, 2005   (EP)  ................................. 05009359

(51) Int. Cl.
  *G01R 31/28*   (2006.01)
  *G06F 11/00*   (2006.01)
(52) U.S. Cl. ..................................... 714/715; 370/241
(58) Field of Classification Search .................. 714/57, 714/712, 715; 370/241, 242, 252; 340/514; 342/165, 173
  See application file for complete search history.

(56) References Cited

U.S. PATENT DOCUMENTS

| 4,091,239 | A | * | 5/1978 | Lainey et al. | ................ | 714/704 |
| 4,646,299 | A | * | 2/1987 | Schinabeck et al. | ......... | 714/736 |
| 5,157,403 | A | * | 10/1992 | Urkowitz | ..................... | 342/111 |
| 5,164,731 | A | * | 11/1992 | Borden et al. | ............. | 342/26 B |
| 5,467,341 | A | * | 11/1995 | Matsukane et al. | .......... | 370/253 |
| 6,070,190 | A | | 5/2000 | Reps | | |
| 7,363,543 | B2 | * | 4/2008 | Peebles et al. | ................ | 714/26 |
| 7,441,154 | B2 | * | 10/2008 | Klotz et al. | ................... | 714/39 |
| 2003/0061015 | A1 | * | 3/2003 | Ben-Gal et al. | ................ | 703/2 |
| 2005/0081111 | A1 | | 4/2005 | Morgan | | |
| 2005/0275524 | A1 | * | 12/2005 | Hom et al. | ................... | 340/514 |
| 2006/0200708 | A1 | * | 9/2006 | Gentieu et al. | ............. | 714/704 |
| 2006/0200711 | A1 | * | 9/2006 | Schondelmayer et al. | ... | 714/712 |

FOREIGN PATENT DOCUMENTS

WO     WO 03/084134 A1    10/2003

OTHER PUBLICATIONS

"TTCN quality metrics" by Kalogeropoulos et al. Electrotechnical Conference, 2000. MELECON 2000. 10th Mediterranean Publication Date: 2000 vol. 1, On pp. 140-143 vol. 1 Meeting Date: May 29, 2000-May 31, 2000 ISBN: 0-7803-6290-X INSPEC Accession No. 7048430.*

"Estimation of SRTT using techniques from the practice of SPC and change detection algorithms" by Ngwenya et al. This paper appears in: AFRICON, 2004. 7th AFRICON Conference in Africa Publication Date: 17-17 Sep. 2004 vol. 1, On pp. 397-402 vol. 1 ISBN: 0-7803-8605-1 INSPEC Accession No. 8304613.*

* cited by examiner

*Primary Examiner*—Cynthia Britt
(74) *Attorney, Agent, or Firm*—Michael J. Fogarty, III

(57) ABSTRACT

On a test apparatus for a telecommunication network a plurality of quality rules are defined as a function of the results of counts of events for a plurality of test parameters. The events relating to the plurality of test parameters during the performance of a test are counted. A plurality of statistics are created from the results of the counts. The statistics and quality rules which belong together are compared. A display is generated on a display unit in accordance with the results of the comparisons showing success or failure for each test run. Details of errors that caused any failure may be displayed using a drill-down technique so that test runs may be run rapidly without requiring expert knowledge of the test apparatus.

15 Claims, 8 Drawing Sheets

FIG. 4

52 — Test Plan nATRQ – LTS21 Load Test System - Analysis
Test Plan  Tools  Help

Test Plan
- New
- Close
- Overview
  - Development
  - Preparation
  - Execution
  - Analysis

54

TestCase Analysis
- Overview
  - TestCase #1

56

Analysis Detail
- Export
- Delete
- Summary
- Details
- Failures 58
60

61

Test Case : Testcase #1 / Analysis /Summary

Summary | Details | Failures

Statistics

| Name | Failures | Result |
|---|---|---|
| ■ System Component | 1 | Failed (1 of 125) |
| ■ Network Interface | 0 | OK |
| ■ Node - B | 0 | OK |

62

Main Failures

| Name | Frequency | Comment |
|---|---|---|
| System Component/ ALCAP /Number of received ERQ messages | 1 | |

64

User: admin    Server: linsrv03

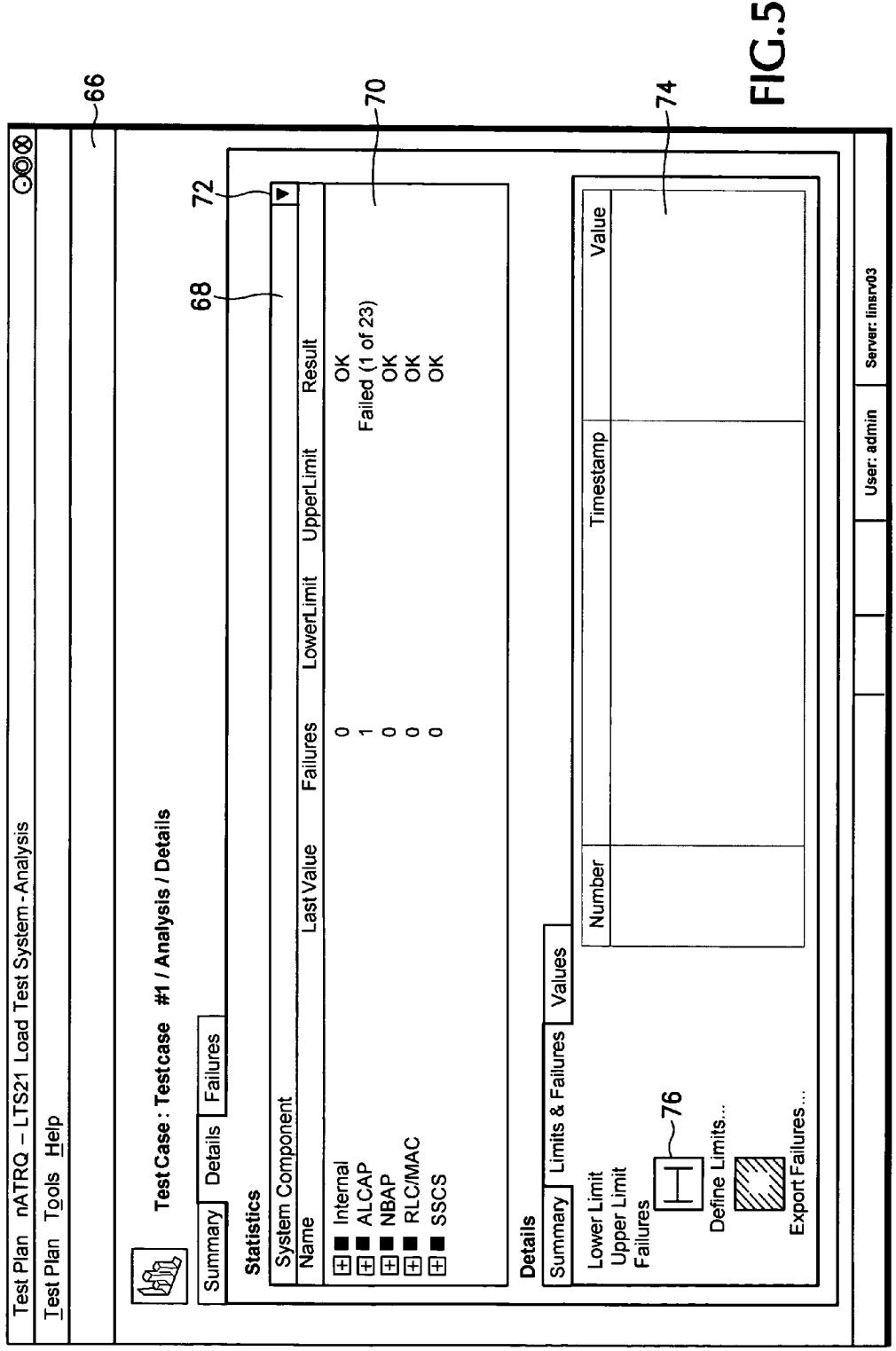

TELECOMMUNICATIONS NETWORK TESTING

BACKGROUND OF THE INVENTION

The present invention relates to telecommunications network testing, and more particularly to displaying test results (success or failure) upon completion of load and systems tests.

Previously all relevant information generated during each telecommunications network test run is stored in a log file in the form of a protocol. From this information the success or failure of the test is extracted. The information has to be sifted through manually, which is very time-consuming—often lasting several hours—particularly when problems occur during the test run. It is presently not possible for a user to determine a cause for the problems or errors without having a very accurate knowledge of the test apparatus being used. As a result determining success or failure of each test run is both time-consuming and knowledge-intensive.

What is desired is a means and method of providing results about each test run on a telecommunications network that is faster and less knowledge-intensive than previously.

BRIEF SUMMARY OF THE INVENTION

Accordingly the present invention provides a means and method for displaying test results for each test run of a telecommunication network that is fast and does not require expert knowledge about any test apparatus. Protocols are no longer consulted for arriving at a determination on the success or failure of a test run, but instead there is a pre-analysis involving the use of statistics where the statistics relate to results of test-relevant events. These may then be related to freely definable quality rules in order to determine the success or failure of a test run. It is then possible to base thereon extended analyses, such as determining causes for errors. By generating appropriate statistics and defining appropriate quality rules, a considerable acceleration of the analysis of the test results is achieved so that there may be performed in a given time a multiple of the number of tests performed in the prior art, resulting in an increase in the quality of the telecommunication network. Further specified tests may be performed in a fraction of the time as required previously, so that considerable cost reductions are realized.

The objects, advantages and other novel features are apparent from the following detailed description when read in conjunction with the appended claims and attached drawing.

BRIEF DESCRIPTION OF THE SEVERAL VIEWS OF THE DRAWING

FIG. 4 is a plan view of a display for a test analysis summary according to a second embodiment of the present invention.

FIG. 5 is a plan view of a display for a test analysis details according to the second embodiment of the present invention.

FIG. 6 is a plan view of a display for an expanded test analysis details according to the second embodiment of the present invention.

FIG. 7 is a plan view of a display for a test analysis failures according to the second embodiment of the present invention.

DETAILED DESCRIPTION OF THE INVENTION

Figure 1:
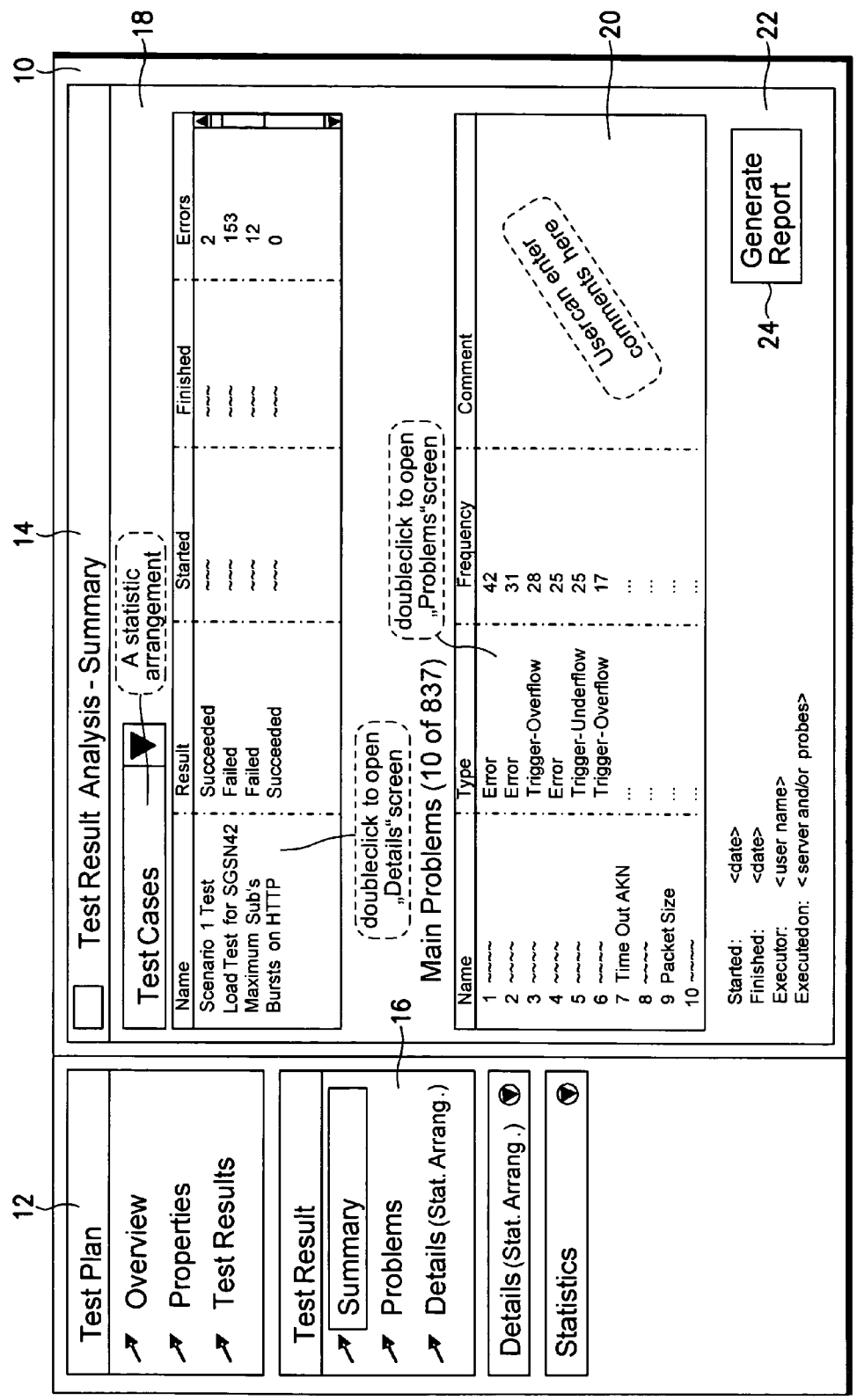
FIG. 1 is a plan view of a display for a test results analysis summary according to one embodiment of the present invention.

Referring now to FIG. 1 a user interface display 10, such as a liquid crystal display (LCD) display, for a telecommunications network test apparatus is shown. A first window 12 provides information to a user about aspects of a test run, which aspects are displayed in more detail in a second window 14. As shown the user may select from Overview, Properties and Test Results by "clicking" on the appropriate term. For the present illustration Test Results is selected, and further aspects are shown in an area 16 of the first window 12 that relate to Test Results. The user may select from Summary, Problems and Details to determine the details that are displayed in the second window 14. The details corresponding to the term Summary are shown in the second window 14 in this illustration. At a top area 18 of the second window 14 are shown the various test cases that have been run by Name, Result, time details (Started and Finished) and number of Errors. According to quality rules that are defined by the user, the relevant test case is marked under Result as having Succeeded or Failed. By selecting, such as by "double-clicking", one of the test cases further details may be displayed, as described below.

Figure 2:
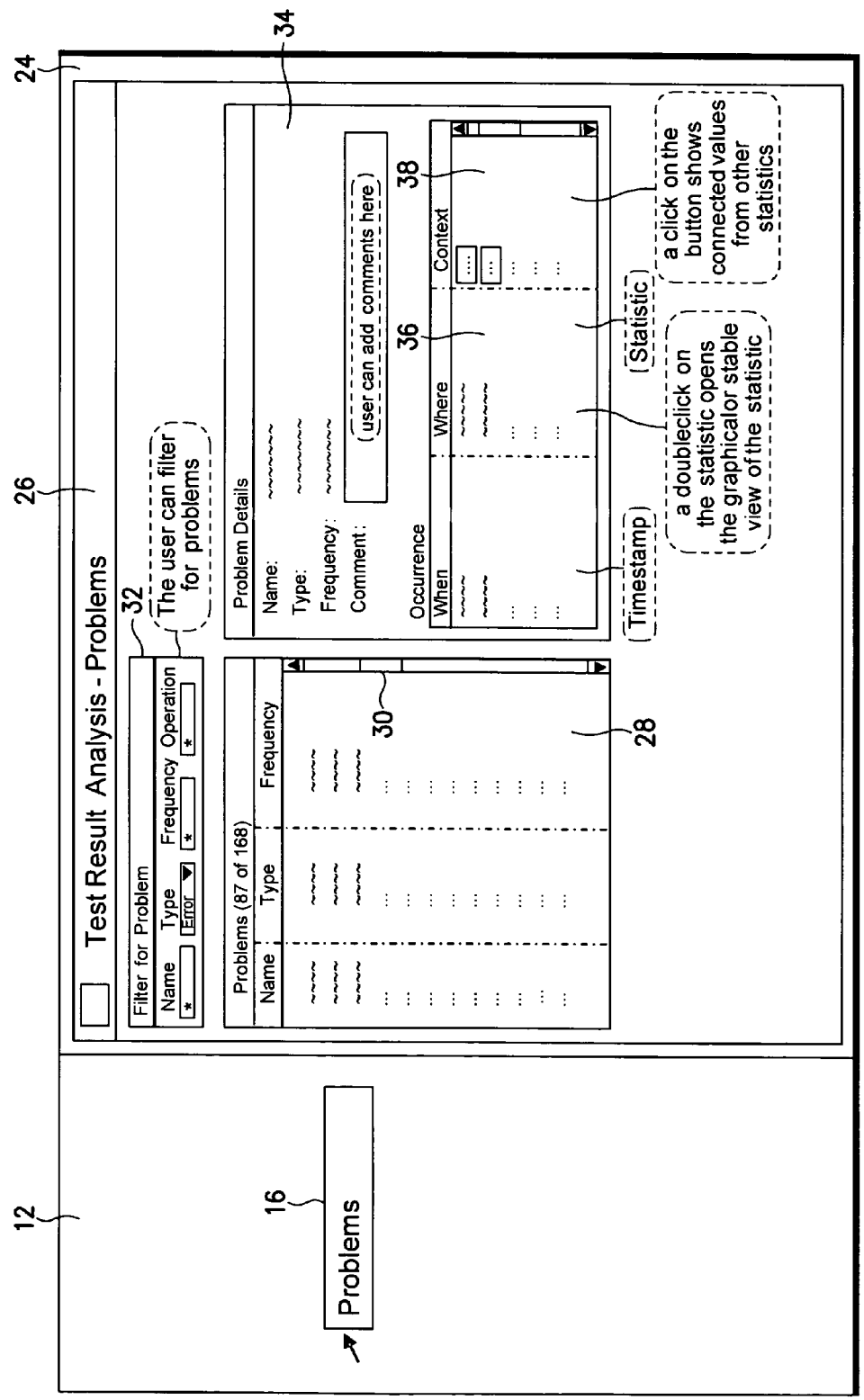
FIG. 2 is a plan view of a display for a test results analysis problems according to the one embodiment of the present invention.

FIG. 2 shows a user interface 25 for the errors (Problems) aspect of Test Results as selected by the user in area 16 of the first window 12. The rest of the information in the first window 12 corresponds to that of FIG. 1, and has been omitted for clarity's sake. In a Problems window 26 the errors are displayed in a Problems area 28 by name, type and frequency. Via a scroll bar 30, similar to the scroll bar 18 of FIG. 1, the user may scroll through the total number of errors. Via a Filter area 32 the user may define an error filter, so that only errors that meet the filter conditions are shown. For this illustration it is possible to include in the filter information the name, type, frequency and link (operation) of the information. If in the Problems area 28 a specific error is selected by clicking on it, details of the error are shown in a Problem Details area 34, such as when the error occurred, within the framework of which statistic and in which context. The term "statistic" is a plurality of counts of events of certain test parameters performed during the execution of the test. From the results of the counts there is set up a plurality of statistics. The user may define for a plurality of test parameters quality rules as a function of results of counts of events. By comparing statistics and related quality rules, it is inferred whether a corresponding test parameter has completed the test successfully or unsuccessfully. What is of importance is that an error is not only defined by the non-fulfillment of a quality rule relating to a plurality of events, but possibly by the non-fulfillment of one single event. "Context" means that certain statistics and/or events may be related to each other. The relatedness may be that they were recorded at the same time as the test parameter event triggering the error; that they were recorded within a specifiable time interval before and/or after the time of the recording of the parameter event triggering the error and relate to the same test parameter or a specifiable selection of test parameters, particularly all test parameters; and/or that they are a specifiable selection of test parameters, particularly all test parameters, that belong to the same call or the same network element and/or to the same subscriber as the event of the test parameter triggering the error.

By double-clicking on an event or a statistic in a statistic area 36 a user interface is displayed on which there may be shown a graphical view or a tabular view of the corresponding event or of the corresponding statistic. By double-clicking on an entry in a context area 38 there are displayed related events and/or statistics in another user interface.

Figure 3:
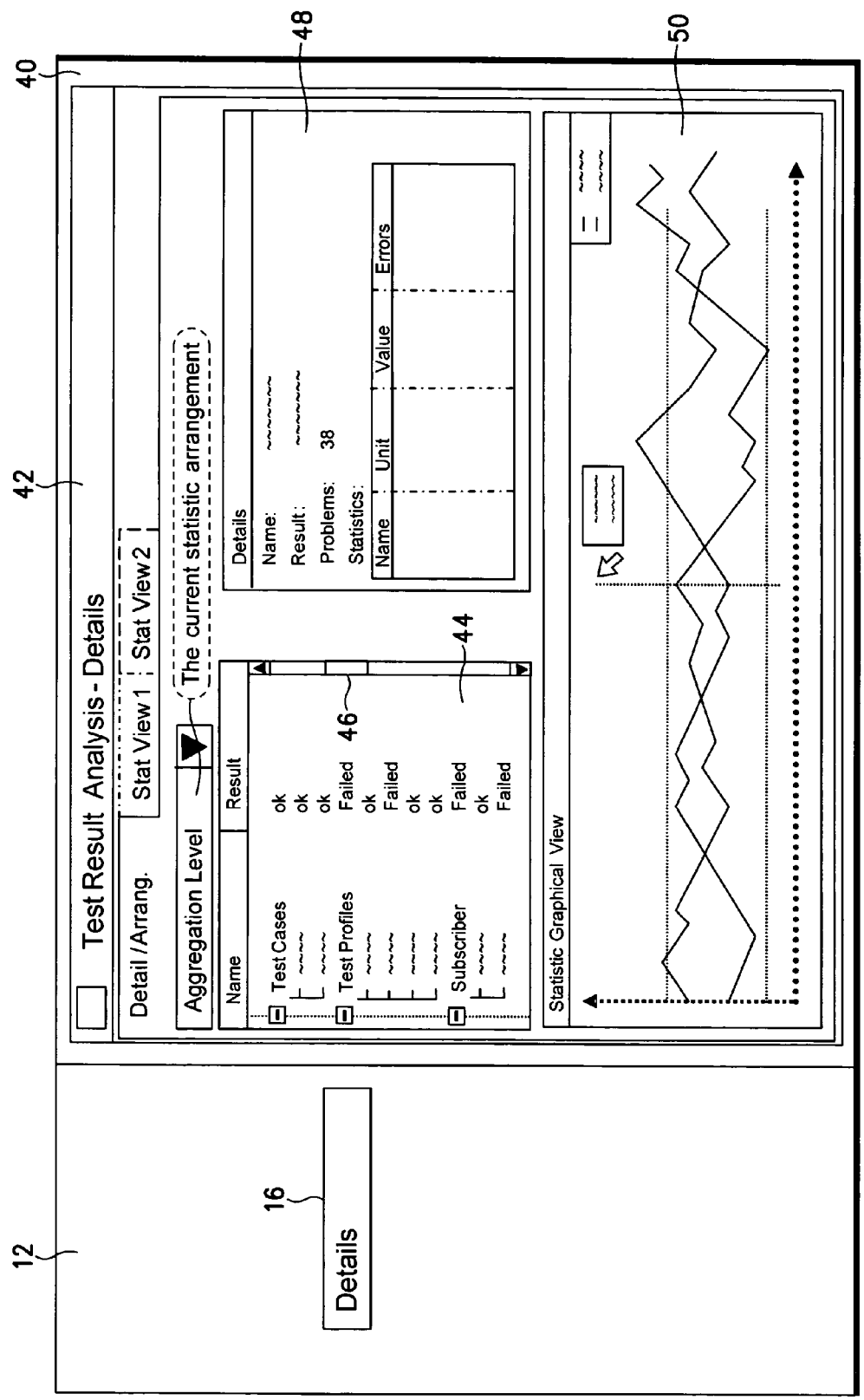
FIG. 3 is a plan view of a display for a test results analysis details according to the one embodiment of the present invention.

FIG. 3 shows a user interface 40 that occurs if the Details entry in the first window 12 of FIG. 1 in the Test Result area 16 is activated by clicking on it. Details on the test results are displayed in a Details window 42 of the user interface 40. In an area 44 the details of the present test are grouped and sorted according to a tree structure so that the user, by clicking on the corresponding entries, may branch to more detailed information or, by clicking on the minus sign, may go to higher levels. Using a scroll bar 46 enables display of another section in area 44. By clicking on an entry in area 44, corresponding details are shown in a details area 48, such as the name of the test case, the result, the number of the errors that have occurred and a table containing information on the events and/or statistics that belong to the test case. In a graphic area 50 the course of the events of a statistic over time is shown.

Figure 6:
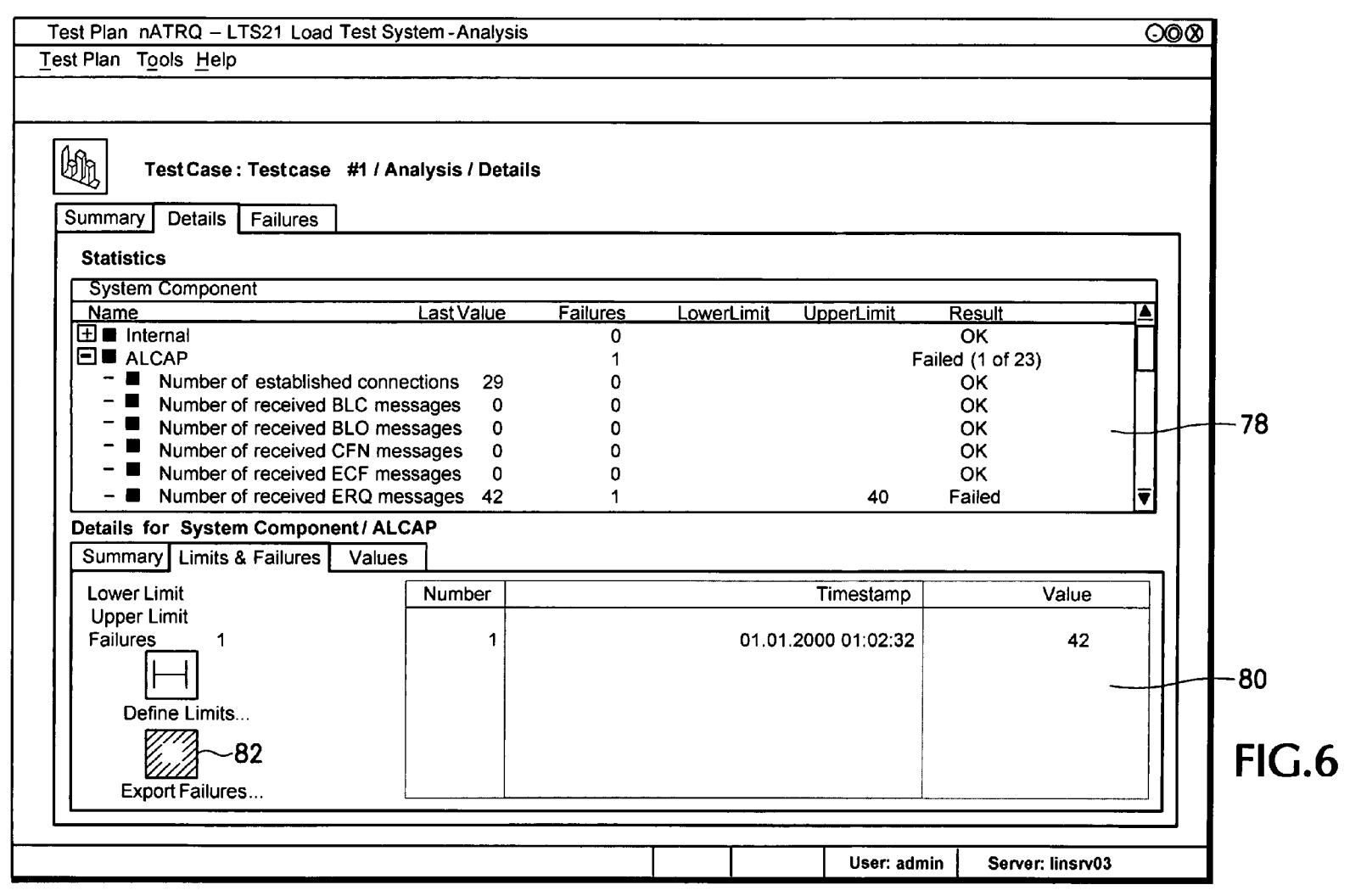
Figure 7:
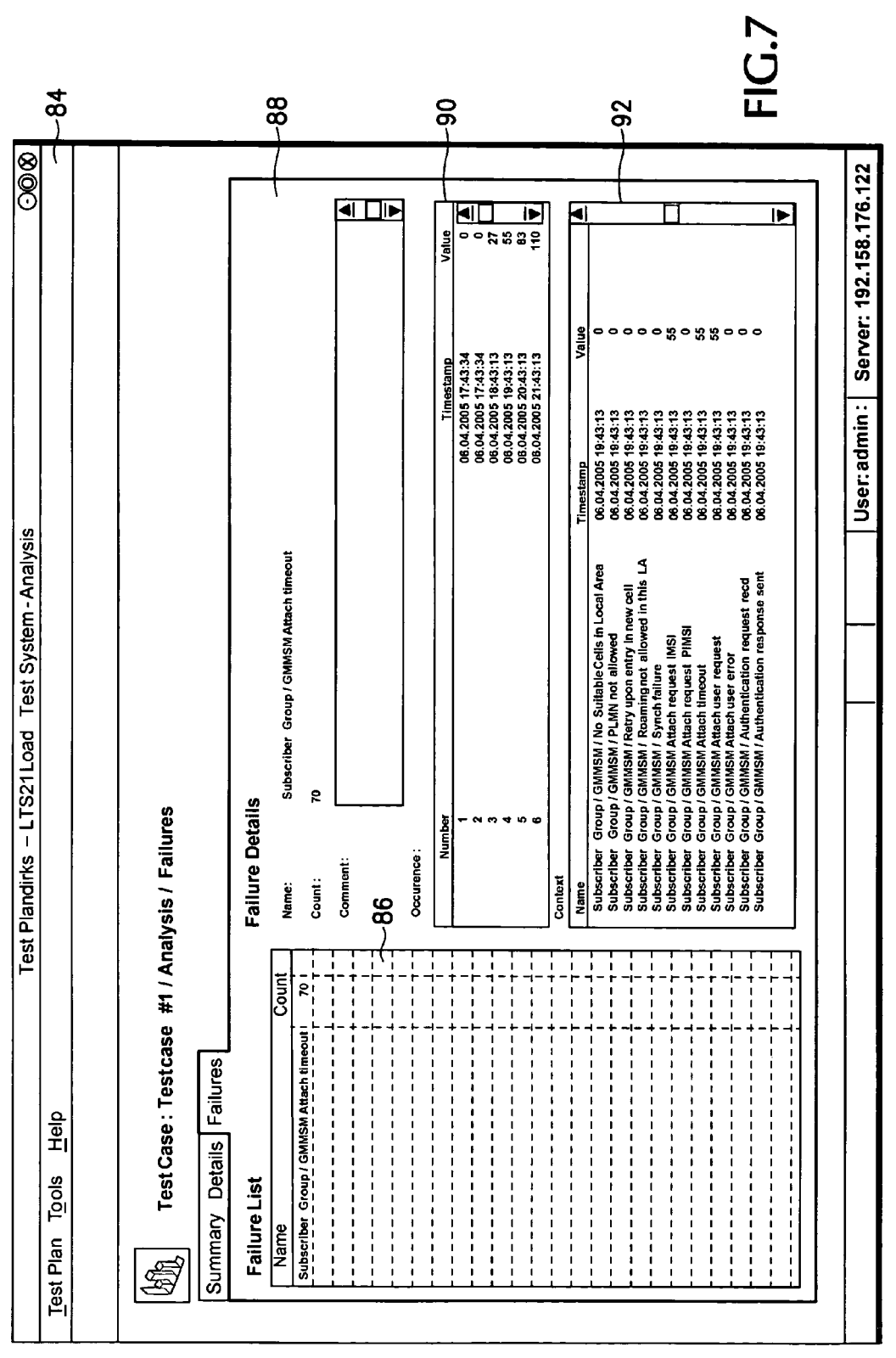

While FIGS. 1 to 3 relate to a first embodiment of the test apparatus, FIGS. 4 to 8 relate to a second embodiment with FIG. 4 corresponding to FIG. 1, FIGS. 5 and 6 corresponding to FIG. 2, and FIG. 7 corresponding to FIG. 3.

FIG. 4 shows a user interface 52, in which Analysis has been selected in an area 54. In an area 56 there is indicated in an overview that the present test has only one test case #1. In an area 58 there are provided capabilities for exporting or deleting analysis details. Finally in an area 60 there are shown three entries for selection by the user. In the present case the Summary entry has been selected, as indicated by the color (shaded) background. The other two entries lead to the user interfaces of FIGS. 5 and 6 (Details) and to the user interface of FIG. 7 (Failures=errors). In a window 61 of user interface 52 there is shown a summary of the analysis results. In a top area 62, there are shown the three elements of the highest level of a tree structure relating to this test case, with two elements (Network Interface and Node-B) shown as OK (preferably using a green color), i.e., these elements have passed the test, while the System Component element is shown as Failed (preferably using a red color) to draw the attention of the user to the fact that an error has occurred for this element. The second column of the table in area 62 gives the number of errors, and the third column indicates whether the test of the corresponding element is considered to have passed or failed. In an area 64 there is shown the main errors and their frequencies. It is possible for the user to enter comments.

FIG. 5 shows a user interface 66 resulting when the term "Details" is selected in area 60 of user interface 52 in FIG. 4. As shown by the entry in line 68, the elements of the tree structure that lie below the "System Component" element are displayed in area 70. By clicking on arrow 72 in line 68, the other elements from area 62 of FIG. 4 may be selected. At this level, too, there are marked, preferably in color, which element(s) errors have resulted. In the present case, the "ALCAP" entry is marked by a symbol as being afflicted with an error, while the other four entries indicate that they have been completed without an error. The table in area 70 gives the number of errors and provides, where quality rules on a specific test parameter are definable and have been defined, a display of the associated lower limit and/or the associated upper limit. Selecting icon 76 allows quality rules to be defined, as described below with respect to FIG. 8.

FIG. 6 shows further details of the tree structure in area 78 which belongs to the "ALCAP" entry that is marked as being afflicted with an error. In the present case the entry "Number of received ERQ messages" is marked by a symbol as being afflicted with an error. As is seen from the entry in the Upper Limit column, the upper limit is 40 events, while in this case 42 events have occurred. In area 80 details on the associated error from area 78 are shown and may be exported by clicking on icon 82.

FIG. 7 shows a user interface 84 that results when in area 60 of the user interface 52 of FIG. 4 the Failures (error) area is selected. In area 86 of the user interface 84 there is given a table in which the occurring errors are given by their name and the associated count. In area 88 there are shown details on the errors selected in area 86, besides the name and the count in area 90, some information on the occurrence, particularly the time and value, and in area 92 information on related events and/or statistics, again with information on the time of the occurrence and the associated value. By clicking on entries in area 92 there may be displayed on the display further details on the entries that are seen there.

Figure 8:
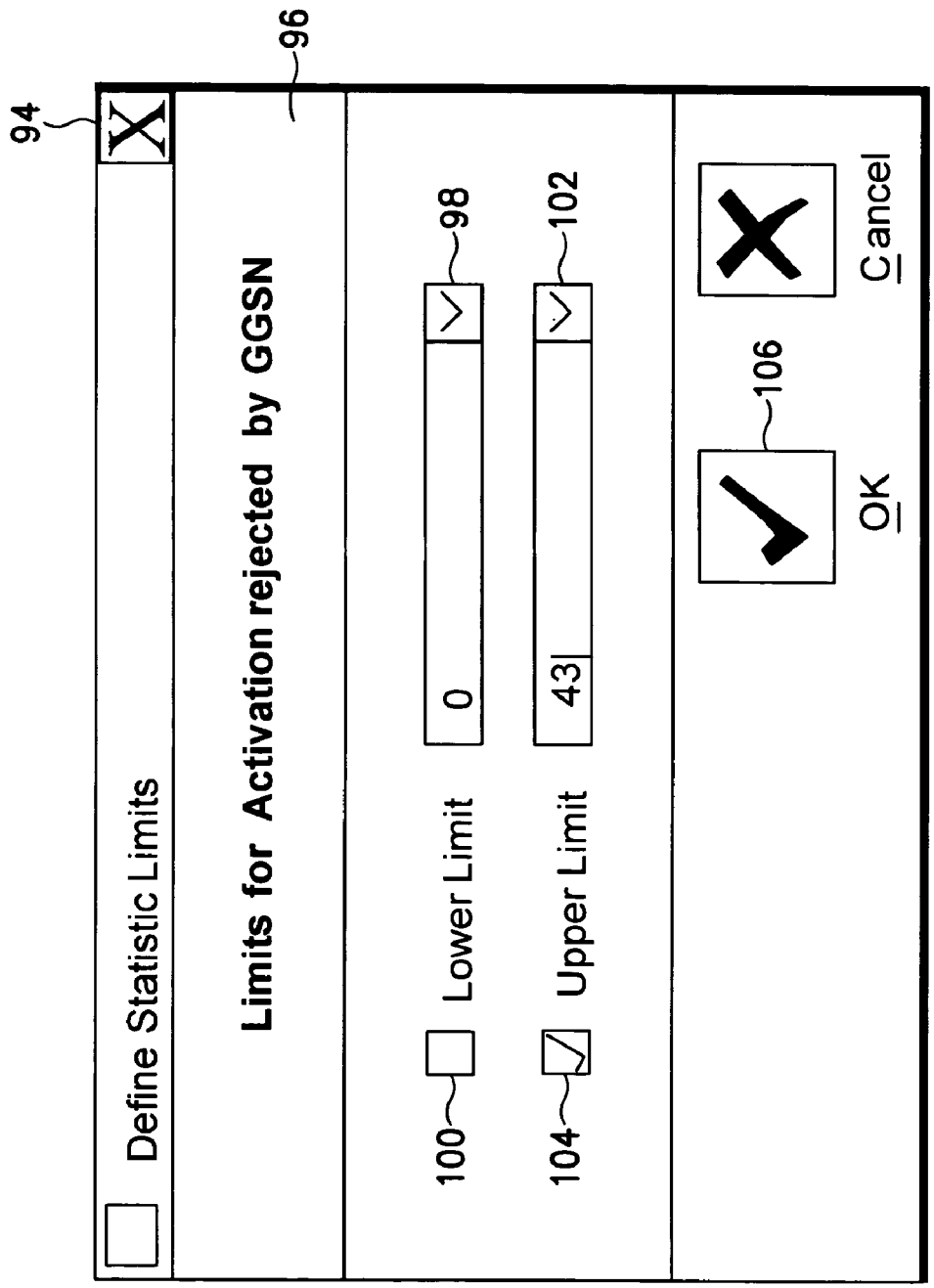
FIG. 8 is a plan view of a display define statistic limits according to the second embodiment of the present invention.

Finally, FIG. 8 shows a user interface 94 that occurs after clicking on the icon 76 of FIG. 5. A field 96 shows the selected statistic or the selected event, such as the failed attempt on a Gateway GPRS (General Packet Radio Service) Support Node (GGSN) to establish a link (Activation rejected by GGSN). The lower limit may be indicated in an area 98 upon the activation of an icon 100, and the upper limit in an area 102 after clicking on an icon 104. Following completion of the entry, it may then be recorded in the system by clicking on icon 106.

Thus the test apparatus provides during a test statistics relating to events for a plurality of test parameters. The user may define quality rules, particularly thresholds, by which the associated statistics are defined as being afflicted with an error when the threshold is exceeded. Just like the statistics, individual events, too, may be defined as errors if they are not executed correctly. In a preferred embodiment more than 200 statistics may be recorded, which corresponds to a data volume of 80 gigabytes per day. Statistics may be grouped in a tree structure that may be predefined or user-defined. One element of the tree structure contains its result, i.e., its assessment as to whether it was completed successfully or unsuccessfully, on the basis of the statistics and events contained in it.

On the test apparatus a so-called "drill-down approach" is implemented by which the user preferably starts with the Summary user interface and tracks the errors within the tree structure downwards until the statistic or the event that has caused the error is found. There is provided the ability to display details on the statistic or the event that caused the error, particularly statistics and events which are related, i.e., stand in context with the statistic/event causing the error.

In the Summary user interface there is shown particular test procedure information, such as the time of the start and the time of the end of the test, the user who started the test, the test environment, a summary of the results with an assessment as to whether the relevant test case was successful or unsuccessful, an indication of the errors of the relevant test case, and finally an overview of the main errors given by their name, type, threshold exceeded or one single event executed incorrectly, and the frequency.

On the error user interface there is displayed a list of the errors, and there is provided the ability to filter for specific errors as well as to list further information on the errors, such as name, type, frequency. In an area of the error user interface there are displayed details on the selected error apart from the name, the type and the frequency, such as information on its occurrence (when, where—in which statistic) and information on the context (giving of related values) which might have something to do with the error.

In another user interface with details of the analysis, there may be selected via the tree structure the test elements on which further details are to be displayed. Moreover, for each element of the tree structure there is given the associated result—whether it was completed successfully or unsuccessfully. In another area of the user interface there are given details on the selected elements of the tree structure, such as the name, the result, the number of errors, possibly a list of the errors, the statistics and results, which were completed unsuccessfully, and which are subordinate to the selected element of the tree structure. Moreover, selected statistics may be shown graphically or in the form of a table.

What is claimed is:

1. A test apparatus for a telecommunication network comprising:
    means for specifying a plurality of quality rules as a function of results of counts of events for a plurality of test parameters;
    means for determining counts of events relating to the plurality of test parameters during the performance of a test;
    means for creating a plurality of statistics from the counts;
    means for comparing from the plurality of quality rules and statistics the statistics and quality rules that are related;
    means for generating a display regarding success or failure of the test from the results of the comparing means: and
    means for defining a tree structure that groups the statistics and events, the tree structure defined by a user and displayed on a display unit for user selection of the statistics and events.

2. The test apparatus as recited in claim 1 wherein an error comprises statistics that do not fulfill the related quality rules.

3. The test apparatus as recited in claim 1 the test comprises a sequence of the events and an error comprises a violation of an incorrect execution of one of the events.

4. The test apparatus as recited in claim 1 further comprising means for marking the statistic and/or event that produces an error from the comparison means in higher levels of the tree structure up to an associated element of a highest level of the tree structure.

5. The test apparatus as recited in claim 4 further comprising means for selecting the associated element of the tree structure on the display unit in order to display subordinate elements.

6. The test apparatus as recited in claim 5 wherein a bottom-most element of the tree structure comprises a file having at least one statistic and/or at least one event that caused the error.

7. The test apparatus as recited in claim 6 wherein the statistics and/or events related to the error are displayed on the display unit for selection.

8. The test apparatus as recited in claim 1 wherein the relatedness comprises one selected from the group consisting of:
    recorded at the same time as a test parameter event triggering the error;
    events of the same test parameter or of a specifiable selection of test parameters, particularly all test parameters, recorded within a specifiable time interval before and/or after the time of the recording of the test parameter event triggering the error; and
    a specifiable selection of test parameters, particularly all test parameters, which belong to a same call and/or to a same network element and/or to a same subscriber as the test parameter event triggering the error.

9. The test apparatus as recited in claim 1 wherein the display comprises a window in which there is displayed information on errors that have occurred during the test.

10. The test apparatus as recited in claim 9 wherein the information comprises a selection of the following: name of error, type of error, frequency of the occurrence of the error, time of the occurrence, and related statistics and events.

11. The test apparatus as recited in claim 10 further comprising a filter in which settings of the information are defined so that only errors that fulfill the settings are displayed on the display unit.

12. The test apparatus as recited in claim 10 further comprising means for selecting the information so that there are displayed on the display unit statistics and events associated with the error.

13. The test apparatus as recited in claim 1 wherein each quality rule comprises at least two test parameters.

14. A method of performing a test on a telecommunication network comprising the steps of:
    defining a plurality of quality rules as a function of results of counts of events for a plurality of test parameters;
    determining counts of events relating to the plurality of test parameters during performance of a test;
    creating a plurality of statistics from the counts;
    comparing from among the plurality of test parameters and statistics the statistics and quality rules which belong together;
    generating a display on a display unit showing success or failure of the test from the results of the comparing step; and
    defining a tree structure that groups the statistics and events, the tree structure defined by a user and displayed on the display unit allowing for selection of the statistics and events.

15. A network test apparatus, comprising:
    a processor;
    a memory;
    a display unit;
    wherein the memory stores computer executable instructions that when executed by the processor perform the following:
    executing a test during which certain test parameters are performed;
    counting events of the certain test parameters performed during the test to determine statistics;
    defining a tree structure that groups the statistics and events, the tree structure defined by a user and displayed on the display unit allowing for selection of the statistics and events;
    comparing the statistics to quality rules, wherein the quality rules are a function of counts of events;
    determining whether a test parameter completed the test successfully based upon the comparison of the statistics and quality rules; and
    displaying on the display unit an indication showing success or failure of the test parameter performed during the test.

* * * * *